(12) United States Patent
Mozer et al.

(10) Patent No.: US 8,024,195 B2
(45) Date of Patent: Sep. 20, 2011

(54) SYSTEMS AND METHODS OF PERFORMING SPEECH RECOGNITION USING HISTORICAL INFORMATION

(75) Inventors: Todd F. Mozer, Los Altos Hills, CA (US); Forrest S. Mozer, Berkeley, CA (US)

(73) Assignee: Sensory, Inc., Sunnyvale, CA (US)

( * ) Notice: Subject to any disclaimer, the term of this patent is extended or adjusted under 35 U.S.C. 154(b) by 1015 days.

(21) Appl. No.: 11/973,821

(22) Filed: Oct. 9, 2007

(65) Prior Publication Data

US 2009/0094033 A1 Apr. 9, 2009

Related U.S. Application Data

(63) Continuation-in-part of application No. 11/167,337, filed on Jun. 27, 2005, now abandoned.

(51) Int. Cl.
*G10L 11/00* (2006.01)
*G10L 21/00* (2006.01)
*G06F 7/08* (2006.01)

(52) U.S. Cl. ........ 704/275; 235/381; 704/231; 704/270; 704/272

(58) Field of Classification Search .................. 704/275
See application file for complete search history.

(56) References Cited

U.S. PATENT DOCUMENTS

| | | | |
|---|---|---|---|
| 5,917,891 A | 6/1999 | Will | |
| 6,154,526 A | 11/2000 | Dahlke et al. | |
| 6,167,117 A | 12/2000 | Will | |
| 6,687,673 B2 | 2/2004 | Mann | |
| 7,174,298 B2 * | 2/2007 | Sharma | 704/270.1 |
| 2002/0065714 A1 * | 5/2002 | Goodwin, III | 705/14 |
| 2002/0120582 A1 * | 8/2002 | Elston et al. | 705/64 |
| 2005/0004798 A1 | 1/2005 | Kaminuma et al. | |
| 2005/0015256 A1 * | 1/2005 | Kargman | 704/272 |
| 2005/0102141 A1 | 5/2005 | Chikuri | |
| 2005/0177376 A1 | 8/2005 | Cooper et al. | |

OTHER PUBLICATIONS

U.S. Appl. No. 11/167,337, filed Jun. 27, 2005, Mozer.
Office Action mailed Jul. 23, 2010, from a corresponding abandoned application, Application No. 11167337, filed Jun. 27, 2005.

* cited by examiner

*Primary Examiner* — Justin Rider
(74) *Attorney, Agent, or Firm* — Chad R. Walsh; Fountainhead Law Group P.C.

(57) ABSTRACT

Embodiments of the present invention improve speech recognition using historical information. In one embodiment, the present invention includes a method of performing speech recognition comprising receiving an identifier specifying a user of a kiosk, retrieving history information about the user using the identifier, receiving speech input, recognizing said speech input in the context of a first recognition set, resulting in first recognition results, and modifying the first recognition results using the history information.

21 Claims, 6 Drawing Sheets

SYSTEMS AND METHODS OF PERFORMING SPEECH RECOGNITION USING HISTORICAL INFORMATION

CROSS REFERENCE TO RELATED APPLICATIONS

This invention is a continuation-in-part of and claims the benefit of priority from U.S. patent application Ser. No. 11/167,337, filed Jun. 27, 2005, entitled "Systems and Methods of Performing Speech Recognition Using Historical Information," the disclosure of which is hereby incorporated herein by reference.

BACKGROUND

The present invention relates to speech recognition, and in particular, to speech recognition using historical information.

Speech recognition is the process of receiving speech in a system and analyzing the speech in a recognizer to automatically determine the words or phrases spoke by a user. Speech recognition is useful in many applications. For example, with the growing prevalence of portable devices such as portable phones (e.g., cellular phones), it has become desirable to use speech recognition to control the operation of such devices so that a user does not have to manually enter information into the device. In cell phones, it is desirable to incorporate speech recognition so that users can operate the phone "hands free." A typical prior art recognition system is illustrated in FIG. 1. At 110, speech input is generated and applied to the input of a recognizer 120. Typically, speech is received by a microphone and converted to an electrical signal using an analog-to-digital converter. The digital representation of the speech signal is the received by recognizer 120. Recognizer 120 then processes the speech signals and produces an output of recognition results at 130. The recognition results may be used to indicate the particular words or phrases spoken by the user as interpreted by the recognizer.

Speech recognition is useful in other applications as well. For example, self service kiosks allow people to access products, services, and information on their own. Traditionally, self service kiosks operate on non-intuitive human interfaces which require some understanding and may limit the types of products, services, and information provided by the kiosk. Speech recognition would make the operation of a kiosk more intuitive and allow for a larger range of products, services, and information to be accessed.

However, speech recognition is rarely a perfect process. Most recognizers can only obtain the correct results a certain percentage of the time. The ability of a recognizer to accurately detect speech signals may depend on a variety of factors, such as the clarity with which the user articulates the speech input signal, background noise, background conversations of other people, or a user's accent to name just a few. Other systemic factors that affect the accuracy of a recognizer include the computing power of the recognizer, the particular speech recognition algorithm or algorithms used by the recognizer, and the accuracy of the conversion from real speech to a digital representation of the speech to name just a few. Because recognizers occasionally produce inaccurate results, users can become very frustrated with speech recognitions systems and may turn the recognition system off or simply opt not to use it.

Thus, it is desirable to make speech recognition systems more user-friendly. Accordingly, there is a need for improved the accuracy of speech recognition. The present invention solves these and other problems by providing speech recognition on a portable device using historical information.

SUMMARY

Embodiments of the present invention improve speech recognition using historical information. In one embodiment the present invention includes an apparatus comprising a self service kiosk, the self service kiosk comprising a speech recognizer including at least one recognition set, wherein the speech recognizer provides a first recognition result and provides modification to the first recognition result, an audio user interface including a microphone, the audio user interface coupled to deliver speech input data to the recognizer, a network interface coupled to retrieve history data through a network and coupled to provide the history data to the speech recognizer, and a identifier selectively coupled to the network interface for providing identification of a user, wherein the network interface utilizes the identification of the user in retrieving the history data, and wherein the speech recognizer utilizes the history data to modify the first recognition set.

In one embodiment, the network includes the internet.

In one embodiment, the history information is stored on a database.

In one embodiment, the network includes a local area network.

In one embodiment, the network includes a wide area network.

In one embodiment, the identifier includes numbers.

In one embodiment, the identifier includes characters.

In one embodiment, the identifier is stored on a radio-frequency identification tag.

In one embodiment, the identifier is stored on a personal electronic device and wherein the identifier selectively couples to the network interface through a wireless personal area network.

In one embodiment, the identifier is stored on a magnetic strip of a card and wherein said kiosk further comprises a card reader for reading the identifier.

In another embodiment, the present invention includes a method of performing speech recognition comprising receiving an identifier specifying a user of a kiosk, retrieving history information about the user using the identifier, receiving speech input, recognizing said speech input in the context of a first recognition set, resulting in first recognition results, and modifying the first recognition results using the history information.

In one embodiment, the method further comprises selecting a first recognition set.

In one embodiment, the receiving an identifier includes a user manually entering characters.

In one embodiment, the receiving an identifier includes a user manually entering numbers.

In one embodiment, the receiving an identifier includes the use of a wireless personal area network.

In one embodiment, the retrieving history information includes generating a query.

In one embodiment, the receiving of an identifier includes a card having a memory element, said memory element having history information, and wherein the retrieving history information includes the kiosk interfacing with said memory element.

In one embodiment, the retrieving history information includes interfacing with a network.

In one embodiment, the interfacing with the network includes interfacing with the internet.

DETAILED DESCRIPTION

Described herein are techniques for improving speech recognition using historical information. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
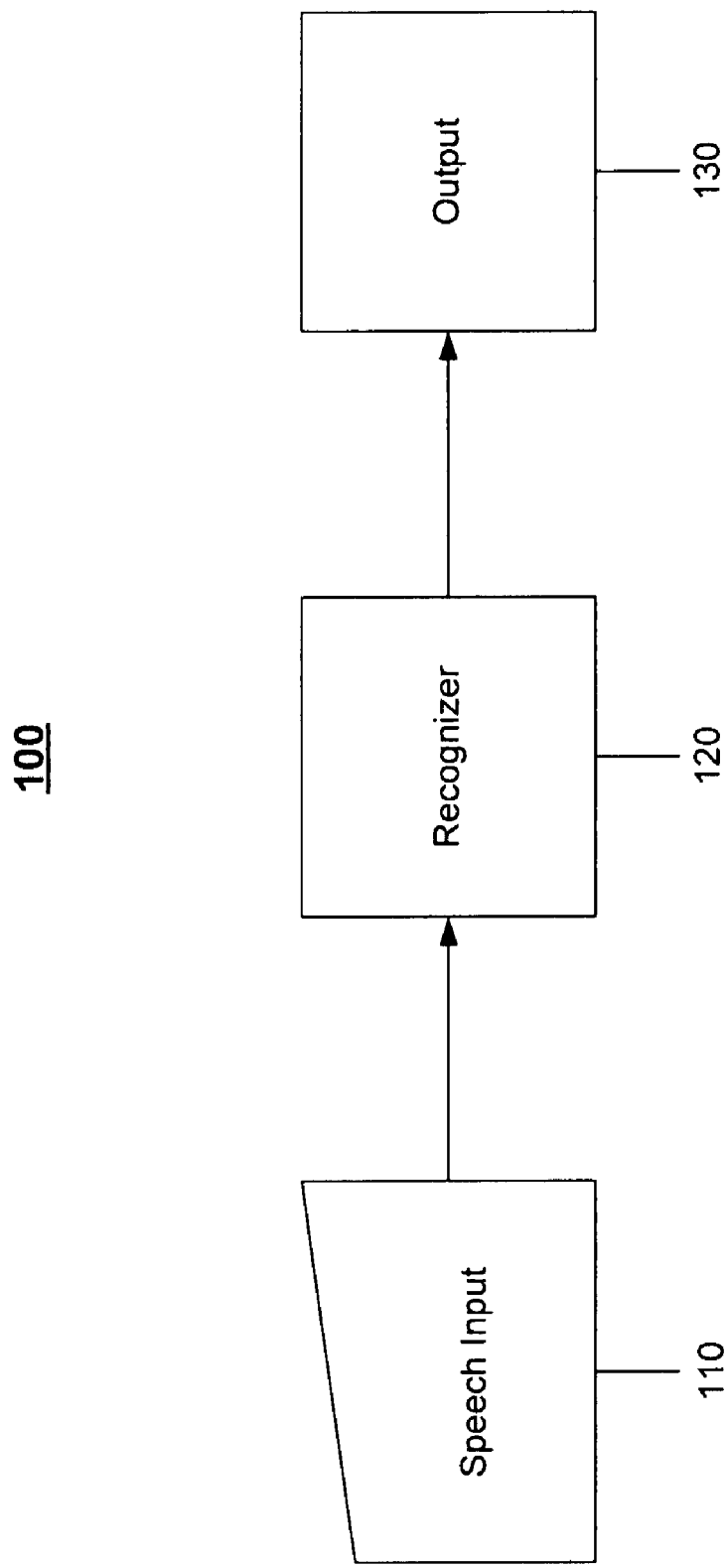
FIG. 1 illustrates an existing speech recognition system.
Figure 2:
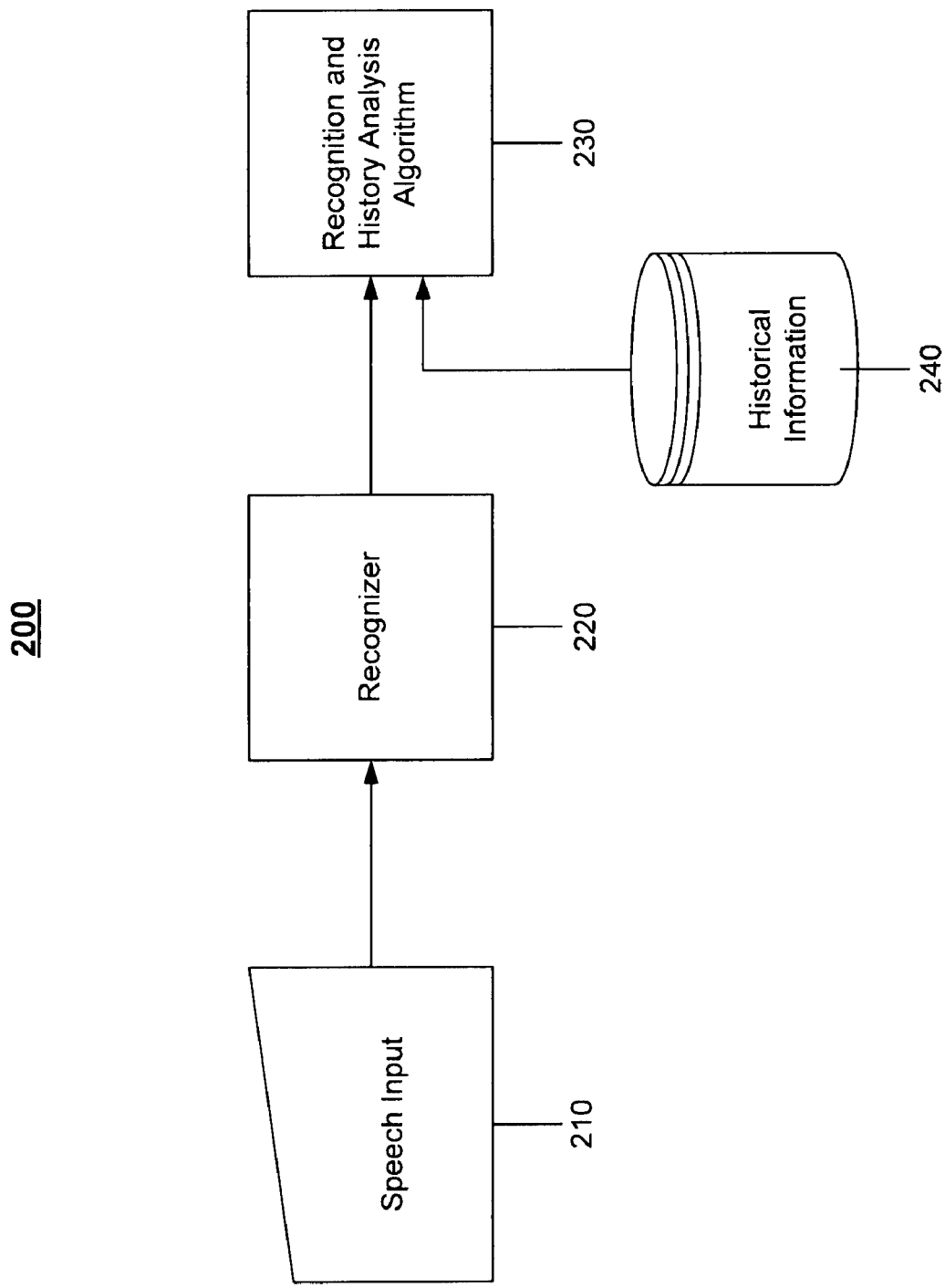
FIG. 2 illustrates a speech recognition system according to one embodiment of the present invention.

FIG. 2 illustrates a speech recognition system 200 according to one embodiment of the present invention. At 210, speech is input to a system such as a portable device. The speech is analyzed by a recognizer 210, which produces recognition results that indicate the recognizer's interpretation of the speech input signals. Recognizers that may be used in embodiments of the present invention may be implemented in software, hardware, or as combinations of hardware and software. A variety of recognizers could be used depending on the particular application and performance desired or acceptable for a particular application. In one embodiment, the present invention includes historical information 240 stored in a memory. The historical information may be accessed and used to improve the speech recognition process. Recognition system 200 also includes a recognition and history analysis algorithm 230. Algorithm 230 accesses the historical information and receives the recognition results. Algorithm 230 may apply the historical information to the recognition results and modify the recognition results using the historical information. For example, the algorithm may identify unrecognized speech input (e.g., speech input that is recognized with a low probability) by comparing a recognized speech input with the history information. In one embodiment, algorithm 230 may be implemented in software as a sequentially executed program.

Figure 3:
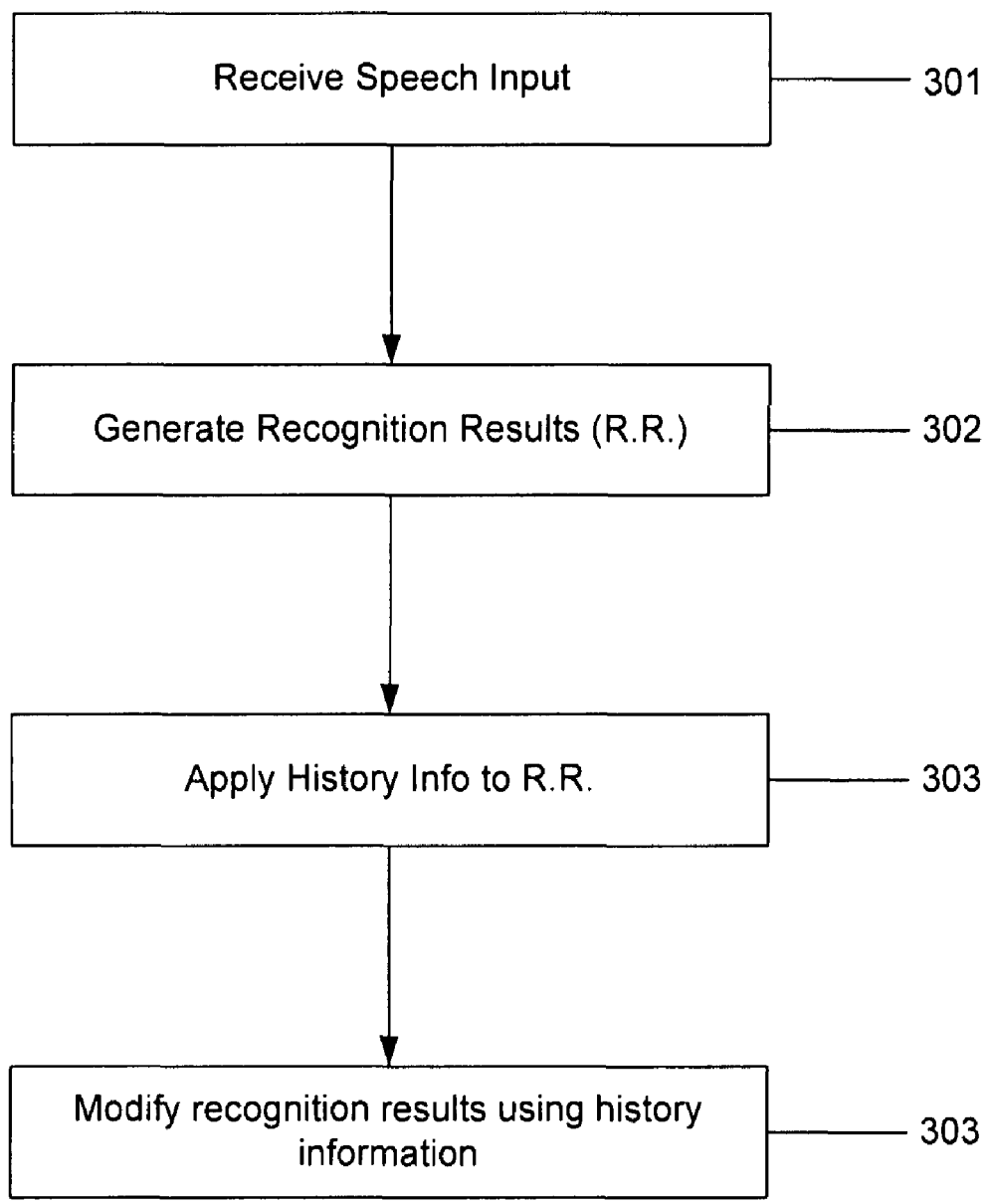
FIG. 3 illustrates a method of performing speech recognition according to one embodiment of the present invention.

FIG. 3 illustrates a method of performing speech recognition according to one embodiment of the present invention. At 301, speech input is received in a portable device. At 302, the speech input is received in a recognizer, and the recognizer generates recognition results based on the speech input. At 303, history information is accessed and applied to the recognition results. At 304, the recognition results are modified using the history information to improve the recognition process.

The advantages of the embodiments described above may best be understood by referring to examples. One example application of the present invention is in a cell phone application that uses digit dialing. In a digit dialing application, a user speaks each digit of a telephone number to be dialed into a microphone on the cell phone. As each digit of a telephone number is spoken by a user, a recognizer analyzes the digital representation of the speech corresponding to the digit and generates recognition results that correspond to the recognizer's interpretation of the input speech. In particular, if the desired telephone number is:

513-899-8027, then a user may speak the following digits in succession: "5" "1" "3" "8" "9" "9" "8" "0" "2" "7". To improve the recognition accuracy, the user may pause slightly after speaking each digit. In one embodiment, the system may prompt the user for area code first (e.g., ask the user to say the words "area code" before entering the digits, thereby indicating the format of the numbers). In response to receiving such digits, the recognizer will generate recognition results that indicate the recognizer's interpretation of each digit. In the example above, a recognizer may return the following digits:

513-899-8?27, where the "?" indicates that the recognizer either did not recognize the eighth digit (i.e., the "0") or that the recognition result for the eighth digit was below a confidence threshold. Thus, the utterance of the digits resulted in a portion of the utterance (here, the "0" digit) not being recognized. In this case the system may access history information to improve the recognition process. For example, history information may include any information regarding the operation or use of the system, such as previously called telephone numbers. If the system maintains a record of telephone numbers previously called by the user in an accessible memory, a recognition and history analysis algorithm may access such numbers and compare the telephone numbers called against the recognized number to identify the unrecognized digit. If the number 513-899-8027 appears in the history information, then the system may automatically conclude that the missing digit is a "0". In one embodiment, when the system generates a final result based on history information, the system may prompt the user with the result. For example, the system may display the final number to the user or the system may generate an audible prompt such as "did you say 513-899-8027?"

As another example, embodiments of the present invention may be used to improve voice dialing. In a voice dialing application, a user may speak the name of a person or business and the system may attempt to recognize the speech and automatically associate a phone number with the recognition result. In one embodiment of the present invention, a plurality of names (e.g., people or businesses) that a person has called in the past may be stored in memory. A person may provide a name as speech input, and the recognizer may attempt to recognize the name. For example, a user may attempt to call Mike Smith by saying "Mike Smith." However, the recognizer may not recognize the first name and may produce recognition results interpreting the input speech as "???? Smith," where the recognized portion of the utterance is the last name and the unrecognized portion of the utterance is the first name. Algorithm 230 of FIG. 2 may receive the recognition results and then access history information, such as a list of names and associated telephone numbers. The names and numbers may be names and numbers that the user called in the past or they may be names and numbers of people or businesses that the user has had contact with in the past (e.g., stored in a contacts database). If the history information includes a record with the fields "Mike Smith" and "513-899-8027," then the system may automatically return the correct name and number as a prompt or automatically dial the number.

As another example, a user may speak only seven digits and the system may automatically determine that the user of a cell phone is roaming. If a user says the digits "8" "9" "9" "8" "0" "2" "7", then the system may generate recognition results corresponding to some or all the digits. The system may then access history information and find the number 513-899-8027. The system may automatically modify the recognition results by returning the complete number with area code "513" and any missing digits automatically inserted and ready for dialing.

Embodiments of the present invention may also use recognition results and history information to improve the accuracy of selecting one of multiple possible results. For example, a user may speak the name "Mike Smith" and the system generate a recognition result "???? Smith." If the history information includes multiple records for "Smith," such as "Jim Smith," "John Smith," "Miles Smith," "Mark Smith," and "Mike Smith," it may be difficult to determine which individual was intended. According to one embodiment, the system may access and compare the number of time each individual was called in the past to help make a determination about the present call. For example, the history information may include the following fields:

TABLE 1

| Name | Telephone Number | Number of Calls |
| --- | --- | --- |
| Jim Smith | 021-999-9991 | 1 |
| John Smith | 123-777-7771 | 5 |
| Miles Smith | 110-111-1119 | 2 |
| Mark Smith | 110-123-1010 | 9 |
| Mike Smith | 110-321-0000 | 75 |

By accessing and using the history information, the system may determine that the user calls "Mike Smith" far more often than any of the other "Smiths." Thus, the system can use this information to make Mike Smith the most likely result. The system may either prompt the user for confirmation (e.g., "Did you say "Mike Smith at 110-321-0000") or the system may automatically call Mike Smith and generate audio such as "calling Mike Smith." If the user actually said "Miles Smith" the system may order the confirmation prompt according to number of calls, asking a user to first confirm "Mike Smith," next to confirm "Mark Smith," and finally to confirm "Miles Smith." While this approach may cause a user to move through multiple prompts in some cases, the majority of the time the user will be able to access the actual number the first time (i.e., because the most called number will always be prompted first in this example). History information indicating the number of calls to a telephone number or person may also be used in digit dialing, wherein if a system cannot recognize a particular digit, such digit may be retrieved from the history information by looking a one or more similar telephone numbers and returning a result corresponding to the number with the greatest number of calls previously made.

In one embodiment, history information may include a telephone number, an associated name, a telephone number call/receive log, telephone number frequency, times, or dates. For example, if a telephone is received digit-by-digit in the recognizer, and the recognizer recognizes a portion of the uttered sequence of digits but does not recognize one or more of the digits, then the system may access all candidate telephone numbers in the telephone number call/receive log and select the numbers that match the recognized portion of the uttered digits. The system may then access telephone number times, dates, or call frequencies associated with each accessed candidate telephone number. The system may then rank the candidate utterances based on date, time, and frequency information. The system may then select most likely candidate telephone numbers based on the most recent time or date information and highest call/receive frequency. For example, if one candidate telephone number was called 10 times in the last week, and another candidate telephone number was last year 9 times, the system may automatically select the more recently called telephone number as the most likely candidate. It is to be understood that such an algorithm could be applied to other devices other than telephone numbers. Additionally, a variety of weighting schemes could be used for the ranking and selection process.

In one embodiment, the system may receive second speech input over a second time interval to clarify the recognition results. For example, if the first input speech is "Mike Smith," and the system only recognizes "Smith," then the user may enter "Mike" as speech input. The system may access a first set of most likely candidate utterances (e.g., "Miles Smith," "Mark Smith," and "Mike Smith"), and then prompt the user to select one of the candidates. In response to the prompt, a user may enter speech input corresponding to an unrecognized portion of the previous input. In this example, "Smith" was recognized, but the first name was not. Thus, a user may enter second speech input ("Mike") to clarify the unrecognized portion. It is to be understood that such a technique could be used in digit dialing, voice dialing, or a variety of other applications.

In one embodiment, an example recognizer may produce recognition results that are probabilities associated with one or more possible outcomes. For example, some recognizers may receive speech input and generate recognition results that associate probabilities with a plurality of candidate utterances. In particular, if a recognizer receives speech input corresponding to the "Mike Smith," then the recognizer may generate the following recognition results:

Pr(Miles Smith)=52%
Pr(Mike Smith)=31%
Pr(Mark Smith)=15%
Pr(John Smith)=1%
Pr(Jim Smith)=1%

In this case, the three most likely candidate utterances are "Miles Smith," "Mike Smith," and "Mark Smith." In one embodiment, the system may access history information and determine that there is some or more historical interaction with "Mike Smith" rather than with "Miles Smith" or "Mark Smith." Thus, the system may make "Mike Smith" the most likely candidate even though the probability is lower. Accordingly, the accuracy of the recognizer is improved by taking into consideration that a user historically calls or interacts with a certain entity more than another.

In one embodiment, a system may order confirmation prompts according to likelihoods received from the recognizer. For example, the default order of confirmation may be to prompt a user to confirm "Miles Smith" first because this name had the highest probability, and then to confirm "Mike Smith" and then "Mark Smith." Using the history information, the system may change the order of confirmation, so that "Mike Smith" is prompted for confirmation first, followed by either "Miles Smith" or "Mark Smith" depending on the history information and probabilities. A variety of algorithms may be used for combining different types of history information with different probabilities.

It is to be understood that a variety of techniques could be used to store the history information. History information may be stored locally or remotely in RAM, a nonvolatile memory such as Flash memory, or on a hard disk drive, for example. The history information may be stored in a database, in an Outlook ".pst" file, or in any accessible software format. In one embodiment, a cell phone or portable communication device may access a call log to determine frequency of calls to a telephone number. Telephone numbers digit dialing may be cross-referenced against contact files in a contacts database such as an Outlook ".pst" file to help improve results. It is also to be understood that the present invention is not limited to telephone systems. A variety of other portable devices may include speech recognition and use history information to improve performance. For example, portable music players (e.g., MP3, IPOD, or any digital music player), portable digital assistants (e.g., Palm, Handspring, or PocketPCs), portable GPS systems, watches, audio recorders, or remote control units could also include speech recognizers and store history information for improving ease of use. History information may include song titles, names of artists or bands, play lists, frequency a song is played (i.e., a number indicating the frequency a song is played), past or future appointments, contact names, addresses, telephone numbers, telephone call frequency, times, dates, emails, websites information for remotely accessing information, coordinates, location names, times, time zones, alarms, television shows, channels, and viewing frequency logs (i.e., a number indicating the number of times a particular channel or program is selected) to name just a few.

Figure 4:
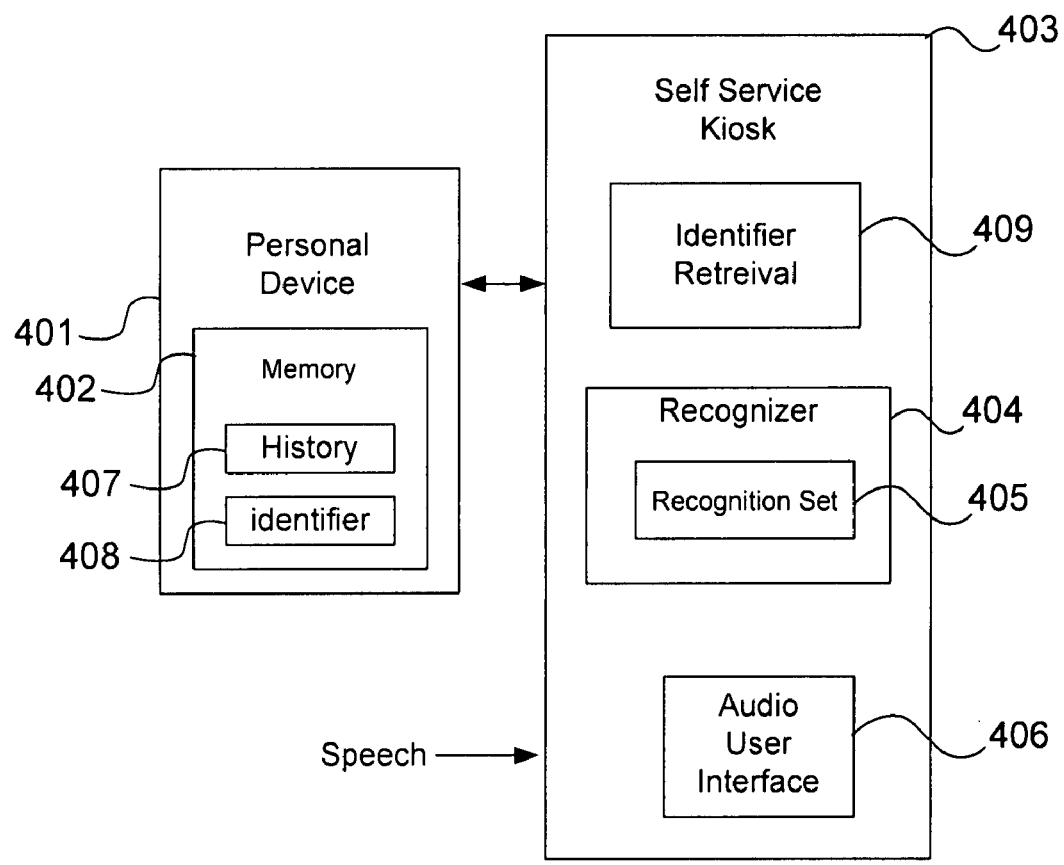
FIG. 4 illustrates another speech recognition system according to one embodiment of the present invention.

FIG. 4 illustrates another speech recognition system 400 according to one embodiment of the present invention. System 400 includes a self service kiosk 403 and a personal device 401. The self service kiosk 403 may be a vending machine, an airline check-in terminal, or an automated teller machine (ATM), or a information kiosk in a hotel or casino. The personal device may be a cellular phone, a personal digital assistant, a portable electronic device, or an electronic card having some memory elements such as a magnetic strip. The personal device 401 includes memory 402 which may include an identifier 408 and optionally history information or data 407, for example. The personal memory 402 may be flash memory, a hard drive, a magnetic strip, or any other form of nonvolatile memory which may be used to store information. The history information may include past purchases, past locations of purchases, and the past dates and times of the purchases, for example. The kiosk 403 includes a recognizer 404, identifier retrieval system 409, and an audio user interface 406. The audio user interface 406 may include a microphone, audio amplifier, an analog to digital converter, and some memory, for example. The recognizer 404 includes a recognition set. The recognition set may be a set of words or snippets which correspond to options available for that kiosk. The recognition set may be organized into several recognition subsets which may correspond to a particular menu or set of options for one point in a hierarchical structure of menus. Identifier retrieval system 409 is used for receiving the identifier. Example identifier retrieval systems may include card readers for reading magnetic strips or other electronic storage medium on a card, local wireless network interfaces for accessing an electronic device (e.g., a PDA) to receive the identifier over a wireless network, RFID readers for accessing identifiers from an RFID tag, or manual entry systems such as a keypad, for example. It is to be understood that the recognizer and identifier retrieval system may be implemented in hardware, software, or as a combination of hardware and software.

In one embodiment of the present invention, the user may approach a coffee kiosk with a card having a magnetic strip, for example. The card would be the personal device in this example, and the magnetic strip would be the memory having some limited information about past purchases. The card may also have credit information like a credit card number, for example. In this example, a user may commonly order a decaffeinated latte coffee when he/she uses a coffee kiosk. The user inserts the card into a card reader on the kiosk and utters, "I'll have a decaf latte". The utterance is converted to digital format by the user interface. The kiosk may receive the identifier from the card and may retrieve history information using the identifier. Optionally, as mentioned above, some history information may be stored on the card and received in the kiosk through the reader. It is to be understood that history information may be stored in a variety of locations including on the card, on the kiosk, or on a network (e.g., in a database). If history information is stored on the card, the card reader may retrieve the card, determine the user's order as described herein, and then update the history information by writing data to the card and then returning the card to the user.

The kiosk may receive the speech input and history information and begin processing the digital voice information in the context of the recognition set and the history information. For example, the recognition set may look as follows:
{decaf latte, decaffeinated latte, café latte, vanilla latte, café mocha, orange mocha, espresso, cappuccino}
The recognizer may generate recognition results that comprise a set of likelihoods or probabilistic assessments corresponding to elements in the recognition set. The results may be based on how well the utterance matched an element (e.g., a word) of the recognition set. The elements may be ranked according to closest match. The result may look as follows:
{café latte; 455,
decaf latte; 450,
café mocha; 255,
vanilla latte; 250,
decaffeinated latte; 225,
orange mocha; 125,
cappuccino; 75,
espresso; 55}
The above example illustrates the a single kiosk item may have two different corresponding elements in a recognition set to recognize common ways of alternatively referring to a single item using different words (e.g., decaf latte or decaffeinated latte). The recognizer may modify the recognition results using the history information. The history information may indicate that the user's ordering preferences on the kiosk. For example, history information may include a list of items purchased and an associated number of purchases. In some embodiments, history information may further include a plurality of kiosk identifiers to identify transaction histories on numerous different kiosks. Similarly, the history information may include a plurality of vendor identifiers so that transactions on different kiosks owned or operated by a common vendor may be recorded and accessed. For example, the identifier from a user's card, together with a kiosk identifier, may be transmitted to a central history information repository and used to access history information for the user on a particular kiosk, and the history information may indicate the number of times a user has performed a particular transaction (e.g., ordering a decaf latte) on the particular kiosk. Returning to the example transaction above, the history information may indicate the following transaction history for this particular kiosk: decaf latte 250; decaffeinated latte 12; café latte 10; vanilla latte 0; café mocha 30; orange mocha 0; espresso 5; cappuccino 8. Since the history information indicates that the user typically orders a decaf latte, the recognizer may weight the decaf latte recognition set element 25% greater. In this example, the system may select the item with the highest number of purchases (e.g., decaf latte 250) and apply a 25% greater weight to that item if the item with next closest number of orders is less than half (e.g., café mocha 30). It is to be understood that a variety of other weighting algorithms could be used and could be based on the number of previous purchases, the time of purchase, date of purchase, or any other factors. Accordingly, the algorithm stated above is only an example. This algorithm may result in the following revised recognition result.

{decaf latte; 563,
café latte; 455,
café mocha; 255,
vanilla latte; 250,
decaffeinated latte; 225,
orange mocha; 125,
cappuccino; 75,
espresso; 55}

This clearly distinguishes the decaf latte as the clear choice and the recognizer returns "decaf latte" as the recognition result. This result may allow the kiosk to prompt the user for confirmation or may allow the kiosk to begin dispensing the desired beverage to the user.

Figure 5:
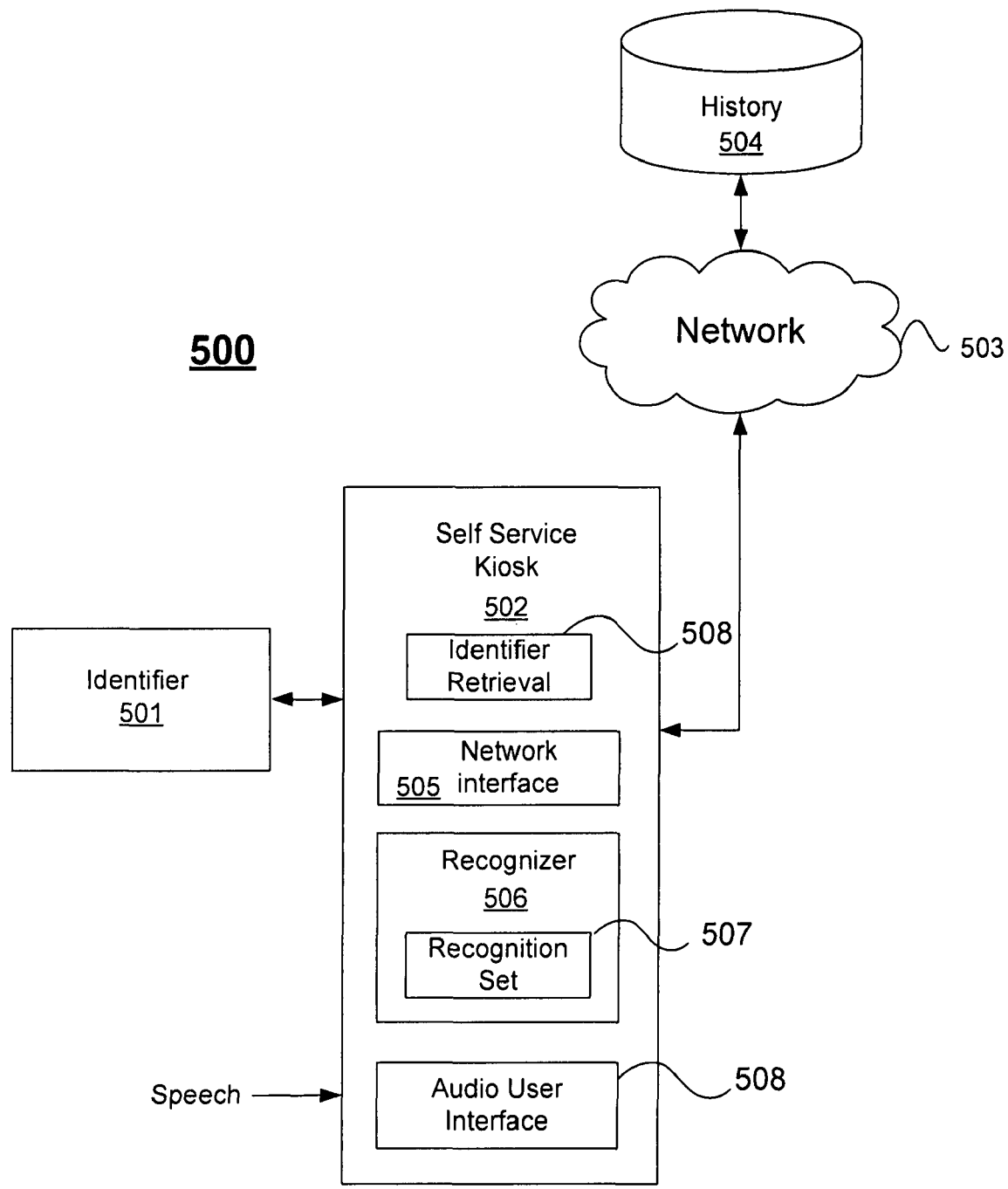
FIG. 5 illustrates another speech recognition system according to one embodiment of the present invention.

FIG. 5 illustrates another speech recognition system 500 according to one embodiment of the present invention. System 500 includes identifier 501, self service kiosk 502, network 503, and history information 504. Identifier 501 may be a set of characters, numbers, or both. The identifier may be an encrypted digital code which identifies the user. An identifier may be information included on an ATM card or a credit card. An identifier may be any means in which a user may establish an identity with the kiosk 502. An identifier 501 may be carried on a personal electronic device outfitted with a wireless technology which may selectively couple the identifier with the kiosk over a personal area network (PNA). Examples of such personal electronic devices are cellular phones, personal digital assistants (PDA), or music players. An identifier may also be selectively coupled with the kiosk via a card having a magnetic strip, a set of keystrokes a user may enter manually on a human user interface device such as a keypad, or a radio-frequency identification (RFID) tag. The self service kiosk 503 may be a vending machine, an airline check-in terminal, an automated teller machine (ATM), an information kiosk in a hotel or casino, an automated toll booth, or any kiosk in which a transaction of service, products, or information is taking place. The network 503 may be a local area network (LAN), campus area network (CAN), metropolitan area network (MAN), wide area network (WAN), or the internet. The network 503 may also be any combination of networks used to access the history information. For example, the kiosk may be located on a college campus and may be networked as part of a wireless LAN which may serve as part of a CAN, and this CAN may be connected to the internet which may access the history information in some database which is part of a LAN for a information depository company somewhere distant from the kiosk. Also, for more secure access, an airline check in terminal kiosk may be networked within a LAN for an airline ticket counter which is connected to a WAN which includes the reservation and ticketing information for its customers. The history information 504 may be a wide variety of information regarding the user history. This may include past purchase information such as type of purchases, dates of purchases, purchase trends, etc. The history information may also include past transactions concerning special requests for service or information. For example, a traveler may always request a window seat on the plane, a special meal, a rental car, or an amount of check-in baggage. Also, a user may always request a map when searching for a restaurant or place of interest from an information kiosk, for example. The history information 504 may reside in a database of history information for a plurality of users and a plurality of kiosks, for example, which may be accessed over network 503. The database may be a secured database or a public access database, for example. The database may be a localized database or a distributed database.

The self service kiosk 502 includes a identifier retrieval 508, network interface 505, a recognizer 506, and an audio user interface 508. As mentioned identifier retrieval 508 may provide the means for receiving the identifier in the kiosk. The network interface 505 may include any interface which assists in interfacing the kiosk 502 with network 503 described in the examples above. The identifier 501 selectively couples to network interface 505 in order to identify the user and use the identifier to retrieve the user's history information. The recognizer 506 includes a recognition set 507. The recognition set 507 allows the recognizer to search for the recognition result within the context of the recognition set. For example, if a vending machine offers candies, the recognition set may be made up of the candy names and variants of those candy names. In this way, the recognizer needs only recognize in the context of these names, and the result may be the element in the recognition set which most closely corresponds to the speech presented by the user. The audio user interface 508 may include a microphone, amplifier, an analog to digital converter (ADC), and memory, for example, for receiving a spoken utterance from a user and converting the utterance into a digital signal that can be processes by the recognizer.

The system 500 provides a product, service, or information to a user when the user provides an identifier and spoken requests. For example, a user approaches a candy vending kiosk. The user's PDA establishes a wireless connection with the kiosk and the identifier is sent to the kiosk to identify the user. The kiosk receives the identifier over the wireless connection, and the network interface communicates with the candy company through the internet and accesses the history information for this user using the identifier. For example, the identifier may be included in a query, for example, which is sent to a database. Additionally, if the company has multiple different kiosks, a kiosk identifier may be included in the query. The history information for the user relating to transaction on a particular kiosk may be returned from database 504 to kiosk 502. The history information establishes that the user always chooses a candy named "Candy A" or a candy named "Candy B" (e.g., Candy A 25; Candy B 14; all other choices 0). The user says "Candy B". The speech is processed through the audio interface 508 and the speech is recognized in the context of the recognition set made up of the names of the candies the machine has to offer. The recognition results may be as follows.

{Candy E,
Candy B}

After the recognition, the history information is used to modify the recognition results. This may result in "Candy B" being dispensed from the machine or a prompt being given to the user to verify the request.

Figure 6:
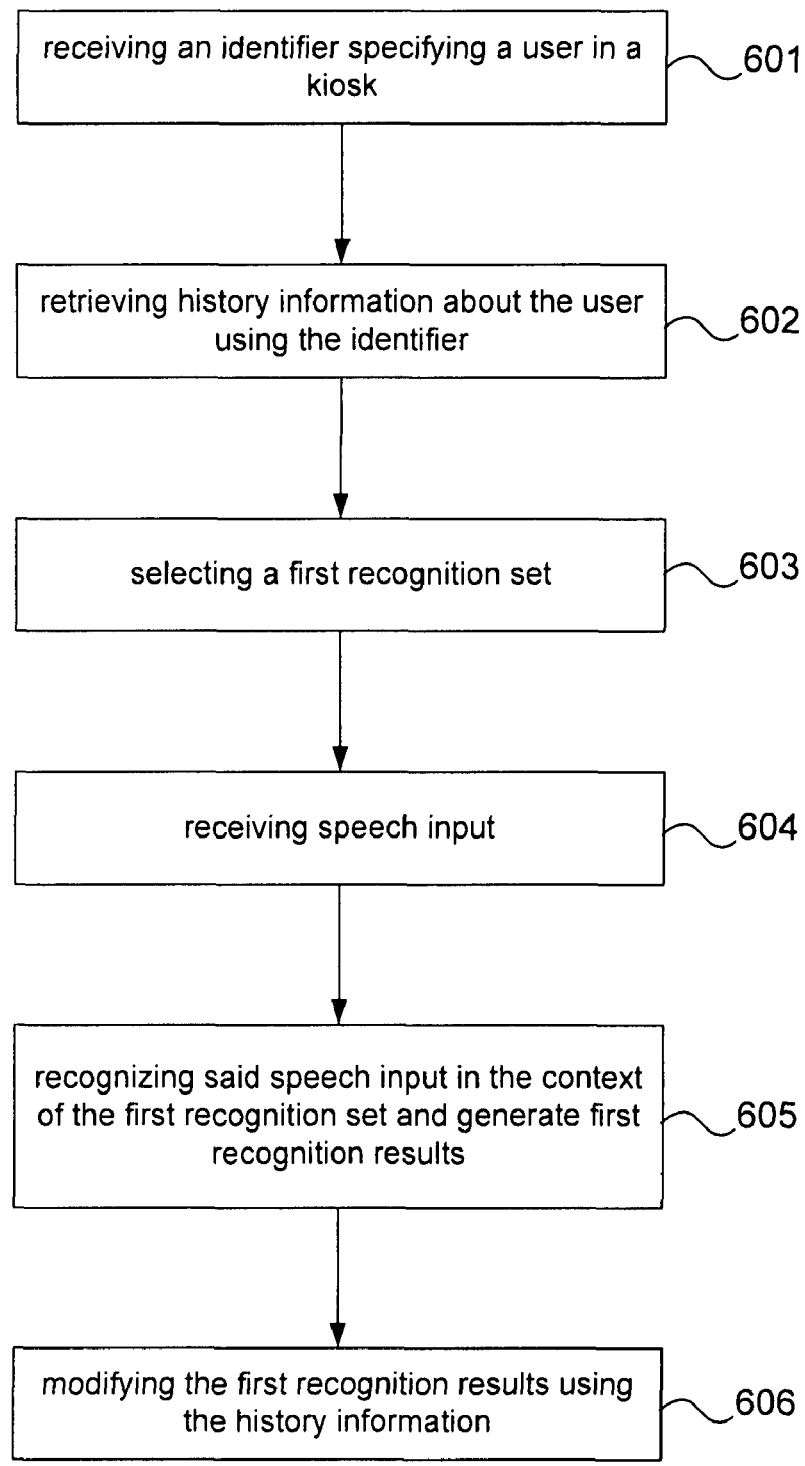
FIG. 6 illustrates a method of performing speech recognition according to one embodiment of the present invention.

FIG. 6 illustrates a method 600 of performing speech recognition according to one embodiment of the present invention. At 601, an identifier is received specifying a user in a kiosk. For example, a user approaches an information kiosk at a tourist location which has many attractions and restaurants. The user may have a watch with an RFID tag integrated into the wristband that stores the identifier, and an RFID reader in or near the kiosk may read the RFID tag to obtain the identifier. At 602, history information is retrieved about the user using the identifier. The history information may be retrieved though a local network or the internet or both. The history information may reside in one database or be located within a distributed database. For example, the RFID tag mentioned previously allows the kiosk to identify the user as a member of a travel club. The kiosk may access the internet though a wired or wireless LAN in the tourist location and downloads history information regarding the user. This user frequently visits fine Italian and Chinese restaurants. At 603, a first recognition set is selected. This may be a recognition set corresponding to a state of a program running on the kiosk, or a position in a menu hierarchy on the kiosk. For example, the user of the information kiosk may have already selected a menu for available places for dining, and the kiosk may display dining options and load a new recognition set for recognizing the displayed options. Accordingly, the first recognition set may be a list of restaurants and other food options located in the vicinity of the kiosk. At 604, a speech input is received. The user may utter "Torrisi's Bistro" because the user prefers fine Italian pasta, for example. At 605, the speech input is recognized in the context of a first recognition set, resulting in first recognition results. In the information kiosk example, the first recognition results may look as follows.

{Toros beef hot dogs,
Orrisias Pizza,
Torrisi's Bistro}

These three entries may be the only recognition results which passed some threshold for recognition such as a threshold for determining a NOTA (None of the above) result. At 606, the first recognition results are modified using the history information. In this example, the user frequently visits fine Italian and Chinese restaurants. The recognizer may choose "Torrisi's Bistro" as the final recognition result and the kiosk may provide directions to "Torrisi's Bistro" or may prompt the user to verify the choice.

Another example of method 600 is an elevator voice recognition system. In this example, the elevator system functions as a kiosk providing transportation service to the floors of a high rise building. The elevator electronics has the names of the different floors, the numbers of the floors, or both the names and the numbers of the different floors programmed into a recognition set. This single recognition set may be reprogrammed at a future date with different names, but otherwise the recognition set remains constant during normal operation. At 601, the user enters an elevator at 8:45 am wearing an identification badge with an RFID tag. The elevator electronics reads the RFID tag and identifies the user. At 602, the elevator electronics retrieves the historical choices made by this user. The history information may include that the user has historically visited the $33^{rd}$ floor, the café floor ($14^{th}$ floor), the main floor ($1^{st}$ floor), and the basement floor. The history information may also include the information that the user typically takes the elevator to the $33^{rd}$ floor in the morning at around 8:30 am. At 604, the user says "$33^{rd}$ floor". At 605, the elevator system recognizes the speech and this results in a list as follows.

{"$3^{rd}$ floor",
"$33^{rd}$ floor"}

At 606, the elevator uses the user's history to choose the $33^{rd}$ floor as the user's desired destination and repeats this verbally to the user prior to executing the controls to move the elevator to the $33^{rd}$ floor.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. An apparatus including a self service kiosk, the self service kiosk comprising:
a speech recognizer including at least one recognition set, wherein the speech recognizer provides first recognition results;
an audio user interface, the audio user interface coupled to deliver speech input data to the speech recognizer; and
an identifier retrieval system to receive an identifier from a personal electronic device, the identifier providing identification of a user,
wherein the identifier is used in retrieving history information, and wherein the speech recognizer uses the history information to modify the first recognition results, and
wherein at least a portion of said history information is stored electronically with said identifier on the personal electronic device, and wherein the kiosk writes history information to said personal device after a transaction.

2. The apparatus of claim 1 wherein the history information is used to modify the ranking of the first recognition results.

3. The apparatus of claim 1 wherein the first recognition results comprise a plurality probabilistic assessments corresponding to words in the recognition set, and wherein the historical information modifies the probabilistic assessments.

4. The apparatus of claim 1 further comprising a network interface for coupling the kiosk to a network.

5. The apparatus of claim 4 wherein the network comprises the Internet.

6. The apparatus of claim 4 wherein at least a second portion of the history information is stored on a remote database.

7. The apparatus of claim 1 wherein the identifier includes numbers or characters.

8. The apparatus of claim 1 wherein the identifier is stored on a radio-frequency identification tag.

9. The apparatus of claim 1 wherein the identifier is stored on the personal electronic device and wherein the identifier and the portion of said history information are received in the kiosk through a wireless network.

10. The apparatus of claim 1 wherein the identifier is stored on a magnetic strip of a card and wherein said identifier retrieval system comprises a card reader for reading the identifier.

11. The apparatus of claim 1 wherein identifier retrieval system comprises a manual interface device.

12. The apparatus of claim 1 wherein the personal electronic device is a cell phone.

13. A method of performing speech recognition comprising:
receiving, by the kiosk from a personal electronic device, an identifier specifying a user of a kiosk;
retrieving history information about the user using the identifier, wherein at least a portion of said history information is stored with said identifier on the personal electronic device;
receiving speech input;

recognizing said speech input in the context of a first recognition set, resulting in first recognition results; and modifying the first recognition results using the history information;

wherein the kiosk writes history information to said personal electronic device after a transaction.

14. The method of claim 13 wherein the first recognition results comprise a plurality probabilistic assessments corresponding to words in the recognition set, and wherein the historical information modifies the probabilistic assessments.

15. The method of claim 13 further comprising retrieving history information using a kiosk identifier.

16. The method of claim 13 wherein the receiving an identifier comprises a user manually entering characters.

17. The method of claim 13 wherein the receiving an identifier comprises a user manually entering numbers.

18. The method of claim 13 wherein the receiving an identifier comprises the use of a wireless network.

19. The method of claim 13 wherein the retrieving history information includes generating a query.

20. The method of claim 13 wherein the personal electronic device is a card having a memory element, said memory element storing said at least a portion of said history information, and wherein the retrieving history information includes the kiosk interfacing with said memory element.

21. The method of claim 13 wherein the personal electronic device is a cell phone.

* * * * *